United States Patent
Dodge et al.

(10) Patent No.: US 10,275,526 B2
(45) Date of Patent: Apr. 30, 2019

(54) SOCIAL NETWORKING AGGREGATOR TO TRACK ILLNESSES

(75) Inventors: Graham Dodge, Windsor Mill, MD (US); James Sajor, Windsor Mill, MD (US); Michael Belt, Windsor Mill, MD (US)

(73) Assignee: Sickweather Inc., Baltimore, MD (US)

( * ) Notice: Subject to any disclaimer, the term of this patent is extended or adjusted under 35 U.S.C. 154(b) by 167 days.

(21) Appl. No.: 14/123,923

(22) PCT Filed: Jun. 14, 2012

(86) PCT No.: PCT/US2012/042441
§ 371 (c)(1),
(2), (4) Date: Dec. 4, 2013

(87) PCT Pub. No.: WO2012/174230
PCT Pub. Date: Dec. 20, 2012

(65) Prior Publication Data
US 2014/0108374 A1    Apr. 17, 2014

Related U.S. Application Data

(60) Provisional application No. 61/496,625, filed on Jun. 14, 2011.

(51) Int. Cl.
*G06F 17/30* (2006.01)

(52) U.S. Cl.
CPC .... *G06F 17/30864* (2013.01); *G06F 17/3087* (2013.01); *G06F 17/30241* (2013.01)

(58) Field of Classification Search
CPC ......... G06F 17/30864; G06F 17/30867; G06F 17/3053; G06F 17/30554; G06F 17/30684
USPC .......................................................... 707/706
See application file for complete search history.

(56) References Cited

U.S. PATENT DOCUMENTS

| | | | |
|---|---|---|---|
| 8,214,977 B2 * | 7/2012 | Szor .................. | G06F 21/56 26/24 |
| 2002/0107641 A1 * | 8/2002 | Schaeffer ............ | G06F 19/345 702/19 |
| 2003/0177038 A1 * | 9/2003 | Rao .................... | G06F 19/3493 705/2 |
| 2004/0236604 A1 * | 11/2004 | McNair ............... | G06F 19/3493 705/2 |

(Continued)

OTHER PUBLICATIONS

Vasileios Lampos ; Intelligent Systems Laboratory, Faculty of Engineering, University of Bristol, UK ; Nello Cristianini "Tracking the flu pandemic by monitoring the social web", Jun. 14, 2010, http://ieeexplore.ieee.org/stamp/stamp.jsp?tp=&arnumber=5604088.*

(Continued)

*Primary Examiner* — Hosain T Alam
*Assistant Examiner* — Nicholas E Allen
(74) *Attorney, Agent, or Firm* — Venable LLP; Michele V. Frank

(57) ABSTRACT

A social networking aggregator computer program that filters user updates from several sources and merges them with geo-tagging data to provide real-time "weather maps" of symptoms and ailments, which can then be used to forecast where and when illnesses spread. Data sources include, but are not limited to popular social media "user broadcasting" platforms, social network sites and smartphone applications.

12 Claims, 4 Drawing Sheets

(56) References Cited

U.S. PATENT DOCUMENTS

| | | | | |
|---|---|---|---|---|
| 2005/0257267 | A1* | 11/2005 | Williams | H04L 63/1408 726/25 |
| 2008/0177571 | A1* | 7/2008 | Rooney | G06Q 50/22 705/2 |
| 2009/0018819 | A1* | 1/2009 | Wright | G06F 17/30719 704/9 |
| 2009/0098527 | A1* | 4/2009 | Fischer | C12Q 1/6806 435/5 |
| 2009/0198511 | A1* | 8/2009 | Boehlke | G06F 19/3443 705/2 |
| 2009/0319295 | A1* | 12/2009 | Kass-Hout | G06F 19/3493 705/2 |
| 2010/0088336 | A1* | 4/2010 | Johnston, IV | G06F 17/30867 707/770 |
| 2010/0175006 | A1* | 7/2010 | Li | G06F 17/30672 715/764 |
| 2010/0332404 | A1* | 12/2010 | Valin | G06Q 30/0239 705/310 |
| 2011/0077973 | A1* | 3/2011 | Breitenstein | G06Q 10/10 705/3 |
| 2011/0083101 | A1 | 4/2011 | Sharon et al. | |
| 2011/0093249 | A1* | 4/2011 | Holmes | G06F 19/3493 703/6 |
| 2012/0041784 | A1* | 2/2012 | Farooq | G06F 19/3443 705/3 |
| 2012/0094274 | A1* | 4/2012 | Sampath | C12Q 1/6846 435/5 |
| 2012/0095775 | A1* | 4/2012 | Burton | G06Q 50/22 705/2 |
| 2012/0190016 | A1* | 7/2012 | Sampath | C12Q 1/689 435/6.11 |
| 2012/0197896 | A1* | 8/2012 | Li | G06F 17/30616 707/740 |
| 2012/0278329 | A1* | 11/2012 | Borggaard | G06F 17/30699 707/738 |
| 2012/0315920 | A1* | 12/2012 | Hampapur | H04W 24/08 455/456.1 |
| 2013/0031041 | A1* | 1/2013 | Maciejewski | G06Q 10/10 706/46 |
| 2013/0059291 | A1* | 3/2013 | Kuhn | G01N 33/56983 435/5 |
| 2013/0198119 | A1* | 8/2013 | Eberhardt, III | G06N 99/005 706/12 |
| 2013/0222141 | A1* | 8/2013 | Rhee | G06F 19/3418 340/573.3 |
| 2013/0297694 | A1* | 11/2013 | Ghosh | H04L 67/02 709/204 |
| 2013/0318027 | A1* | 11/2013 | Almogy | G06F 19/3493 706/52 |

OTHER PUBLICATIONS

Christakis, Nicholas, "Social Network Sensors for Early Detection of Contagious Outbreaks", Sep. 15, 2010, http://journals.plos.org/plosone/article?id=10.1371/journal.pone.0012948.*

Culotta, Aron "Detecting influenza outbreaks by analyzing Twitter messages", Jul. 28, 2010, http://arxiv.org/pdf/1007.4748v1.pdf.*

Ariha, "Social Media and the Changing Face of Global Health Care," [online], May 24, 2012, retrieved Aug. 6, 2012. <http://fueled.com/blog/social-media-and-the-changing-face-of-global-health-care/>.

Kay Ewbank, "Sickness as a social network," [online] Jun. 1, 2011, retrieved Aug. 6, 2012. <http://www.i-programmer.info/news/155-social-media/2512-sickness-as-a-social-network.html>.

International Search Report in PCT International Application No. PCT/US2012/042441, dated Aug. 17, 2012.

* cited by examiner

SOCIAL NETWORKING AGGREGATOR TO TRACK ILLNESSES

CROSS REFERENCE TO RELATED APPLICATIONS

This application is a U.S. National Stage of International Application No. PCT/US2012/042441, filed Jun. 14, 2012, which claims priority to U.S. Provisional Application No. 61/496,625, filed Jun. 14, 2011, the disclosures of which are hereby incorporated herein by reference in their entirety.

BACKGROUND

Field of the Invention

This invention relates to a method and computer program for tracking illnesses.

Background of the Invention

Illnesses are tracked by various means and by numerous local, state and federal government entities, such as the Centers for Disease Control, and state health departments in order to identify trends and slow the spread of disease. Tracking of illnesses is particularly of interest if the illness is contagious in nature or caused by environmental sources. Computer programs used by health professionals are available, such as GOOGLE FLU TRENDS, HEALTH MAP or GLOBAL PUBLIC HEALTH INTELLIGENCE NETWORK to track the spread of infectious diseases. Researchers at the London School of Hygiene and Tropical Medicine have also launched The Flu Survey, which has recruited volunteers from 10 European countries to report symptoms and provide weekly updates of the spread of flu across the continent. A smartphone application, INFLU, tracks the response of users who rate the strength of their symptoms on a red dial, before plotting their position on the map so that other app users can avoid them. None of these programs track illnesses in real time and the data gathering of the programs is limited.

SUMMARY OF THE INVENTION

The present invention is drawn to a computer program that filters updates on social networking sites to provide the user information about the location and spread of illnesses and health-related dangers.

DETAILED DESCRIPTION OF THE INVENTION

The present invention is drawn to a social networking aggregator computer program that filters user updates from several sources and merges them with geo-tagging data to provide real-time "weather maps" of symptoms and ailments, which can then be used to forecast where and when illnesses spread. Data sources include, but are not limited to, popular social media "user broadcasting" platforms such as FACEBOOK, TWITTER, GOOGLE PLUS, GOOGLE OPENSOCIAL, FOURSQUARE, YELP and LINKEDIN. Additional sources can include other sites and regional sites such as ORKUT, HI5, MYSPACE, FRIENDSTER, QQ (China), V KONTAKTE (Russia), SINA WEIBO (China), MIXI (Japan), CYWORLD (South Korea), QZONE (China), ZING (Vietnam), and WRETCH (Taiwan).

The computer program of the invention applies a search engine onto the aggregated data to single out key words and/or phrases that are commonly used to represent illness, getting sick, ailments, and specific names of diseases. Second, the computer program of the invention applies negative key words to those terms to qualify the terms as a positive instance. Third, the computer program of the invention locates the originating latitude and longitude of the data to plot the positive instances on a map. Alternatively, the second step of the computer program of the invention applies a search to these results to identify if the data includes location information such as city, state, province, country or zip code. The alternative third step, if the computer program of invention does not identify location information in the data, the computer program of invention discards the data that does not contain location information. Fourth, if location information is found, the computer program of invention locates the latitude and longitude of the available location information. Fifth, if the computer program of invention locates the latitude and longitude of the aggregate data, the computer program of invention searches the results for negative key words and phrases that are indicators of false reports of illness, getting sick, ailments and specific names of illnesses. Finally, the remaining aggregate data that contains latitude and longitude information, and that does not contain any negative key words or phrases, is plotted on a map, and is termed, "qualified aggregate data." An alternative final step is that the remaining aggregate data is grouped by a specified mile radius distance from each other and a specified window of time to be represented as clustered activity on the map.

Figure 1:
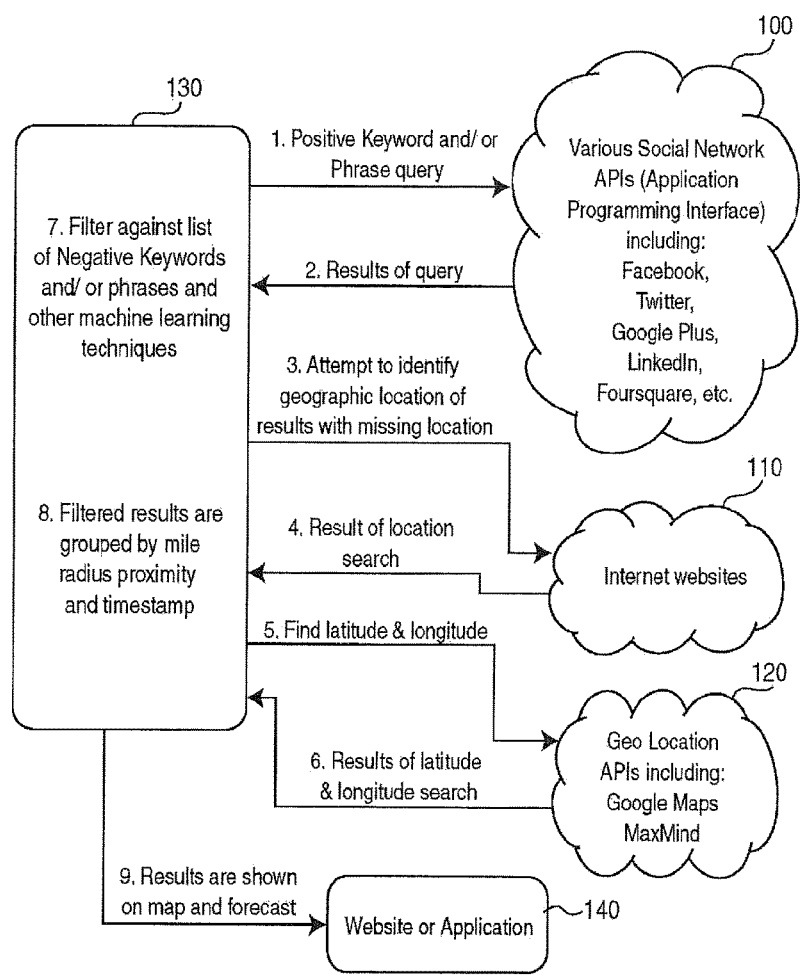
FIG. 1 depicts a process of the invention.

FIG. 1 is a graphical representation of the computer program system of the invention. The order of the steps may change from time to time, depending on optimal processing requirements and/or users' requests. Other steps may be added or deleted if such additions or deletions would enhance the accuracy of the information or the users' experience. In Step ①, a positive keyword and/or phrase search entry is entered to "the Social Graph" 100. In Step ②, the results of the query is sent to a database server 130 where the following steps are used to qualify relevant locations to the results and relevancy to the symptoms and illnesses being tracked. An attempt to identify the geographic location of the results with a missing location is shown in Step ③ by gleaning more public information from networking and internet websites 110 about the origin of the data. From the internet websites 110, the program obtains results of the location search as seen in Step ④ and are then sent to other third party Geo Location and Geo-coding services 120 such as GOOGLE MAPS, MAXMIND and GOOGLE EARTH to match the locations with longitude and latitude information in Step ⑤. Once latitude and longitude results are returned in Step ⑥, the remaining data is then filtered by the database server 130 and its list of negative keywords and phrases and other machine learning techniques that make use of natural language processing in Step ⑦ to indicate whether or not the data is relevant to symptoms of illness being tracked. Then, filtered results are either grouped by a specified mile radius proximity and time-stamp in the database server 130 in Step 8 and then displayed on a map and forecasts through the website or application 140 in Step 9, or just sent directly to the website or application 140 if they are not able to be grouped.

Figure 2:
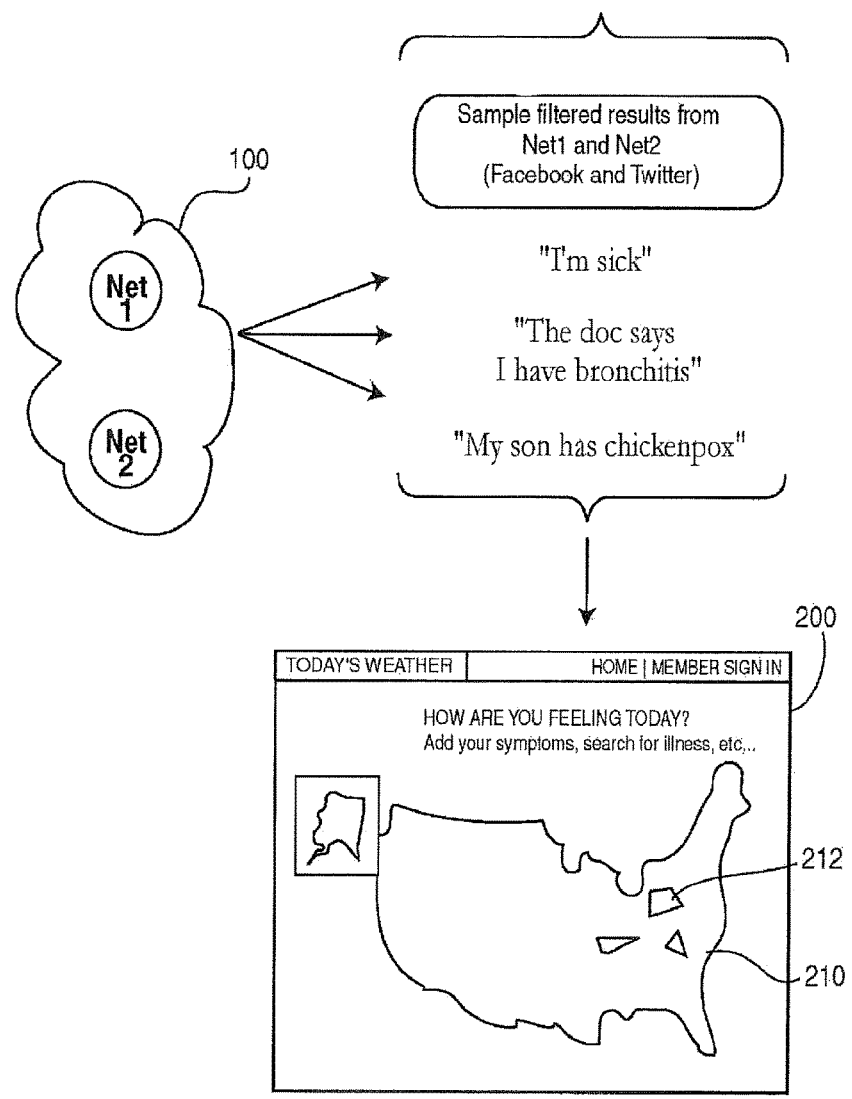
FIG. 2 is a graphical overview of the invention.
Figure 3:
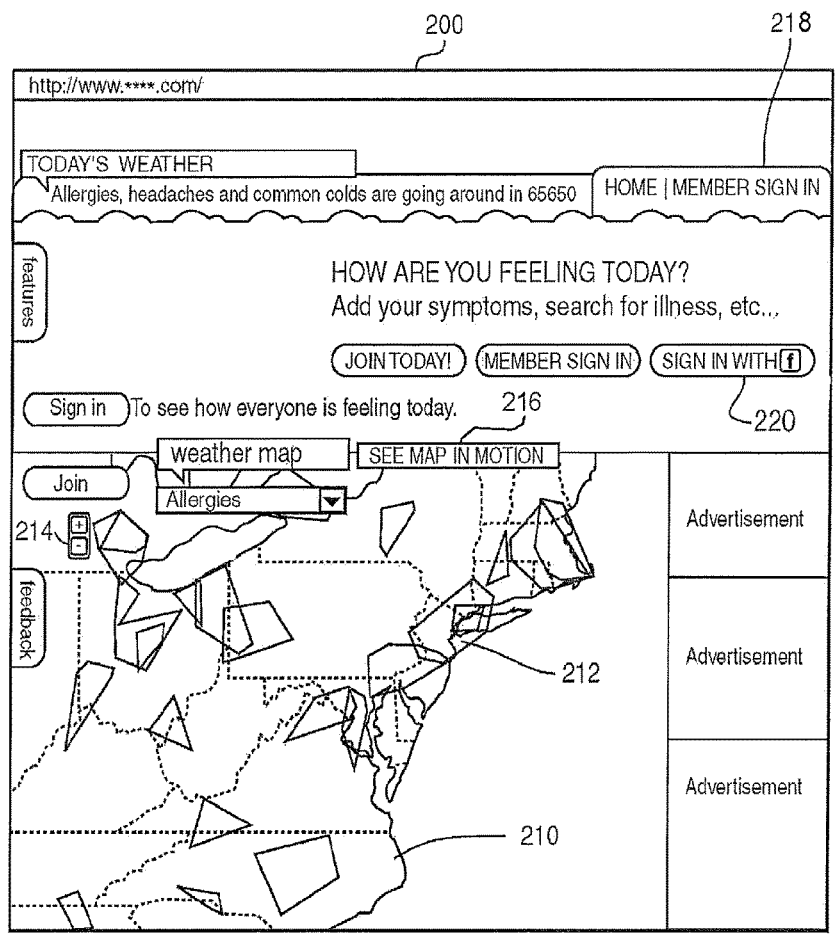
FIG. 3 shows a screen shot example and user interface.

FIG. 2 illustrates how the conversations from the networking sites translate onto the map of the invention. Everyday thousands of people around the globe update social media sites, "Net 1" or "Net 2" 100, like FACEBOOK and TWITTER when they (or someone close to them) get sick. Posts like "I'm sick," "the doc says I have bronchitis" and "My son has chickenpox" are gathered up by the program for analysis and location mapping. When this information is made publicly available by the user and contains location information, the program tracks and maps this data. The map 210 is displayed on a screen interface 200 and the areas of illnesses are shown as polygons 212 on the map 210. A screen shot 200 is shown in FIG. 3 and is described below in "Working Examples."

"Illnesses" as used herein includes mental illness such as stress and depression, and "chronic illness" such as cancer, contagious illnesses and/or diseases caused by viruses, bacteria, protozoa, insect bites, and other living organisms. Such illnesses or diseases include: influenza, West Nile virus, avian flu, norovirus, chicken pox, measles, rabies, encephalitis, meningitis, dengue fever, Lyme disease, Rocky Mountain spotted fever, and the like. Also included are allergens and/or pollen counts, and health emergencies or conditions such as forest fires, boil water alerts, dangerous animal activity, pollution alerts, bioterrorism alerts, and the like. Public health notices and recalls can also be included either as news alerts or postings on a website.

The program has information available to the public as well as an optional member login area where information is only available to members ("Registered Users"). Among other features, members have access to maps and information which is available on an "advanced search" function, where further refined information is presented. Registered users can link their accounts to FACEBOOK, TWITTER, GOOGLE+ or any other social network accounts. The purpose of linking social media accounts is to form a "social circle" for users to be informed of illnesses among friends and family with whom they have close contact. Private messaging, identities of sick circle members, and the ability to send gifts, get well cards and games, and the like are available to Registered Users as well.

Additionally, the program of the invention allows its members to report directly to the map and forecast anonymously via the input field under "How Are You Feeling Today?" The user types in how he or she feels and the program performs a "best match" to the most relevant forecasts. If symptoms or illnesses are reported that are not currently being tracked, that information are processed by the program to automatically make suggestions for expanding tracking capabilities. In this regard, the program continues to "learn" as users input information. Individual reports of illnesses are also shown on a map using icons or data point indicators.

A newsfeed is optionally available to Registered Users to show only health-related posts from within the Registered User's social circle and serves as a way for users to stay informed of who has illnesses within their personal network. A function is optionally available to Registered Users that allow them to create and view a chart to track their own health, as well as the health of any family members or friends for whom they are reporting on their behalf, and can act as an informal medical chart. The ability to track one's own medical history can also be combined with healthful living practices such as tracking exercise, calorie intake and the like.

The program of the invention can be gamified, as the user uses more services, they can earn virtual items, such as "sympathy badges," points, or levels for their accomplishments. Prizes not only drive additional usage, but also encourage sympathetic communication among users, which increases the amount of information that can be gathered by the program and thus enhances the accuracy and timeliness of the information available to users.

An augmented reality function is also included in the invention. The augmented reality function allows users to tag a specific public place where they know there is a health threat and/or sick individual that could be a threat to others.

A smartphone application is also included in the invention. The smart phone functionality, such as notification alerts for when new illnesses pop up in your area, as well as animated maps and forecasts are included so a user can easily see in real time, the spread of diseases in a desired area. Applications are available in commonly used platforms, such as iPHONE and ANDROID, and the like. The smart phone program scans social networks for indicators of illness, allowing users to check for the chance of sickness, using network outlets such as FACEBOOK, TWITTER, GOOGLE PLUS, GOOGLE OPENSOCIAL, FOURSQUARE, YELP and LINKEDIN. Additional sources can include other sites and regional sites such as ORKUT, HI5, MYSPACE, FRIENDSTER, QQ (China), V KONTAKTE (Russia), SINA WEIBO (China), MIXI (Japan), CYWORLD (South Korea), QZONE (China), ZING (Vietnam), and WRETCH (Taiwan). The smartphone program of the invention also allows users to update their friends and followers when they get sick. The smart phone program of the invention, gleans the immense amount of real-time data available on the health of the population through various sources and the program filters and qualifies this data and cross references them with location tags to produce real-time "weather maps" of reported symptoms, which is available on the hand-held devices of the user. As described for the computer program of the invention, the information is then used to forecast the movement of illness, sicknesses and other health-related issues.

WORKING EXAMPLES

Example 1

Real-Time Mapping of Global Illnesses

The user interface 200 of the invention is shown in FIG. 3. A map 210 is displayed of a region desired to be viewed by the user. Overlays of regions where certain illnesses are determined by the program are shown in shaded or colored geometric shapes 212 overlaying the map 210. In one embodiment of the invention, the geometric shapes are calculated and formed based on a predetermined mile radius distance that the data points are from each other and the timestamp of the reports, so that data points that occur within a certain proximity and time are shown as being grouped using the shaded or colored geometric shapes. The data representing positive instances on the map is presented as a "weather map" of illnesses to the user, to show when and where illnesses are located. On the map, the user has the ability to zoom in, zoom out 214 and initiate a time-lapse animation 216 of where the contagion or disease is spreading. When several reports appear nearby each other at approximately the same time, they are grouped as potential storm activity represented by polygons and/or lines. These may change shape as the user zooms in and the density becomes more refined. At map zoom level 4, polygons are drawn to group illness reports within 4 hours and 30 miles radius of each other; at map zoom level 3, polygons are drawn to group illness report within 4 hours and 15 miles radius of each other, and so forth. Thus, if the user zooms in far enough, individual reports down to the street level can be shown. Memberships are included in the invention and a member can log into a member area 218 to obtain additional information and/or high zoom potential. Additionally, a user may log in through social networking sites, such as FACEBOOK or TWITTER 220.

Figure 4:
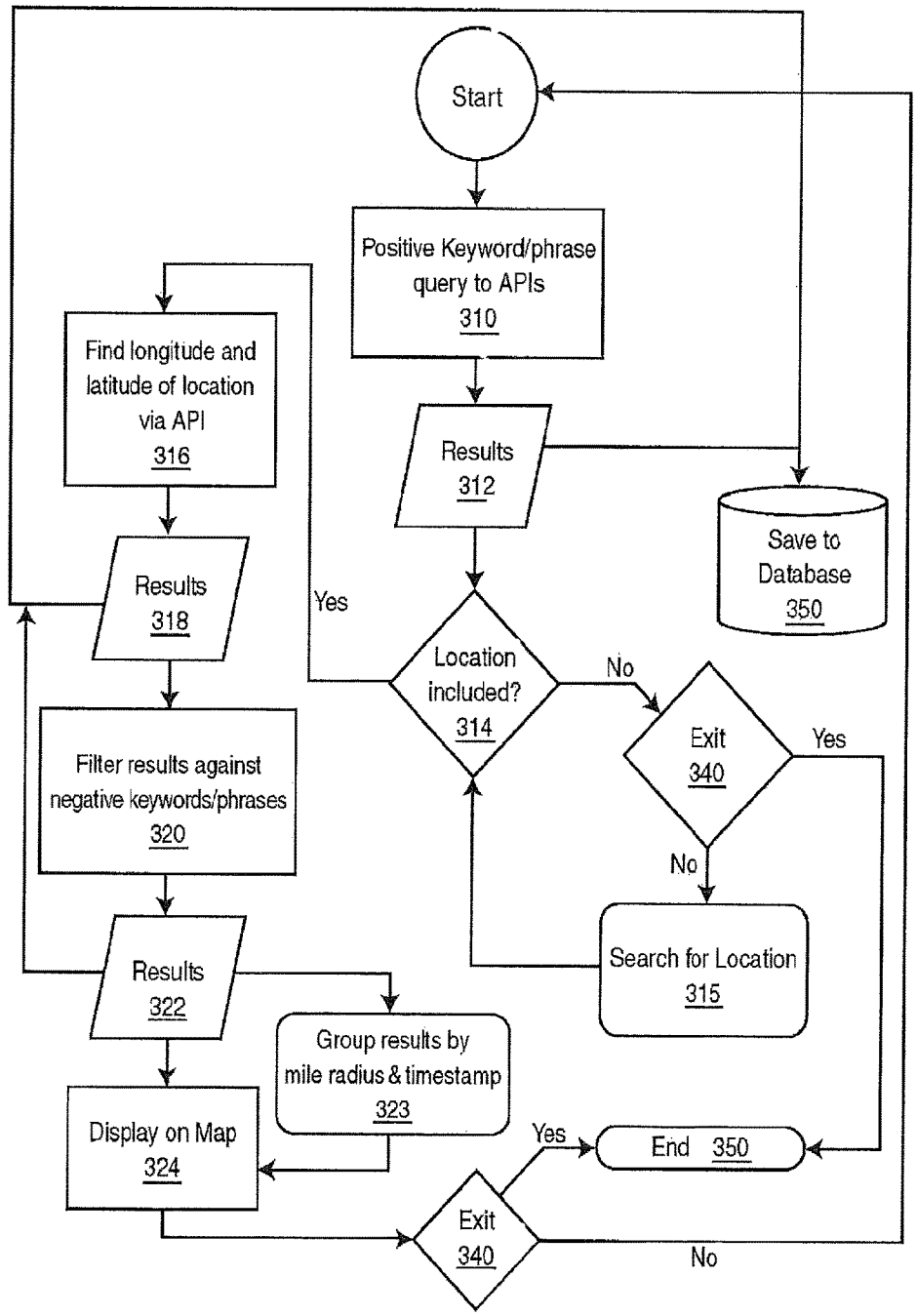
FIG. 4 is a flow chart of a process of the invention.

A flowchart showing the implementation of the method and computer program of the invention is shown in FIG. 4. Positive keywords or phrases are queried to application programming interfaces ("APIs") 310, which then yields results 312. If such results 312 have a location included 314, then the longitude and latitude of the location via the API is obtained 316. If a location is not included, then the program can either exit 340 or search for a location 315. Once a location is found 314, and the longitude and latitude are located 316, the results 318 are filtered against negative keywords or phrases 320 "Negative keywords", as used herein are words or phrases that indicate that a posting is not discussing illnesses. Such phrases, by example would include a posting such as, "I have Bieber fever!", or "I'm sick about how ugly my new hair is!" and the like. Such negative phrases are filtered out and not used in the final displayed results. The results 322 can either be displayed on a map 324 or the results can be grouped by mile radius and time stamped 323, then displayed on a map 324. Afterwards, the user can exit the program 340. All results obtained are also saved to a database 350 for further "learning" by the system. Further "learning" by the computer program means that words or phrases that cannot be filtered as specified by the system are saved for later processing either by the computer system, by human intervention, or a combination of the two. Nothing herein would preclude oversight, modification or intervention by humans and/or users.

Overview of the Invention

The invention includes a computer program that filters updates on social networking sites to provide information about the location and spread of illnesses and health-related dangers, comprising: at least one program instruction for loading into a server used for providing a service website; at least one program instruction loaded into the server to execute following steps: applying a search engine onto aggregated data to single out key words and/or phrases that are commonly used to represent a health-related danger; applying a search to these results to identify if the data includes location information such as city, state, province, country or zip code; if the computer program does not identify location information in the data, the computer program of invention will discards the data that does not contain location information; if location information is found, the computer program locates the latitude and longitude of the available location information; if the computer program of invention locates the latitude and longitude of the aggregate data, the computer program of invention searches the results for negative key words and phrases that are indicators of false reports of health related dangers creating a qualified aggregate data set; and plotting the remaining qualified aggregate data that contains latitude and longitude information, and that does not contain any negative key words or phrases, on a map; and displaying the qualified aggregate data in a user friendly interface similar to a weather forecast or weather radar map; and providing various tools for selecting and changing views and visualizations of the data and sharing and commenting on the data with social networking tools.

The invention also includes an online service system, comprising: a server, comprising: a data transmission unit; a verification unit, coupled to the data transmission unit, for sending a verification link corresponding to a user account that is not verified through the data transmission unit; and a service providing unit, coupled to the verification unit and the data transmission unit, for providing a service web site; said online service system that filters updates on social networking sites to provide information about the location and spread of illnesses and health-related dangers, comprising the steps of: at least one program instruction for loading into a server used for providing a service website; at least one program instruction loaded into the server to execute following steps: applying a search engine onto aggregated data to single out key words and/or phrases that are commonly used to represent a health-related danger; applying a search to these results to identify if the data includes location information such as city, state, province, country or zip code; if the computer program does not identify location information in the data, the computer program of invention will discard the data that does not contain location information; if location information is found, the computer program locates the latitude and longitude of the available location information; if the computer program of invention locates the latitude and longitude of the aggregate data, the computer program of invention searches the results for negative key words and phrases that are indicators of false reports of health related dangers creating a qualified aggregate data set; and plotting the remaining qualified aggregate data that contains latitude and longitude information, and that does not contain any negative key words or phrases, on a map; and displaying the qualified aggregate data in a user friendly interface similar to a weather forecast or weather radar map; and providing various tools for selecting and changing views and visualizations of the data and sharing and commenting on the data with social networking tools.

The invention also includes a method for providing an online service, adapted to a server providing a service website, the method comprising: sending a verification link corresponding to a user account that is not verified through the data transmission unit; and a service providing unit, coupled to the verification unit and the data transmission unit, for providing a service web site; said online service system that filters updates on social networking sites to provide information about the location and spread of illnesses and health-related dangers, comprising the steps of: providing at least one program instruction for loading into a server used for providing a service website; providing at least one program instruction loaded into the server to execute following steps: applying a search engine onto aggregated data to single out key words and/or phrases that are commonly used to represent a health-related danger; applying a search to these results to identify if the data includes location information such as city, state, province, country or zip code; if the computer program does not identify location information in the data, the computer program of invention will discards the data that does not contain location information; if location information is found, the computer program locates the latitude and longitude of the available location information; if the computer program of invention locates the latitude and longitude of the aggregate data, the computer program of invention searches the results for negative key words and phrases that are indicators of false reports of health related dangers creating a qualified aggregate data set; and plotting the remaining qualified aggregate data that contains latitude and longitude information, and that does not contain any negative key words or phrases, on a map; and displaying the qualified aggregate data in a user friendly interface similar to a weather forecast or weather radar map; and providing various tools for selecting and changing views and visualizations of the data and sharing and commenting on the data with social networking tools.

Additionally, the computer program, online service system and/or method of the invention include qualified aggregation data that are displayed in a manner from the group selected from: on a website, or an application, or other media such as television, radio and print. Also, the method includes at least some of the information is provided only to paid members of the service.

Having now fully described this invention, it will be understood to those of ordinary skill in the art that the same can be performed within a wide and equivalent range of conditions, formulations, and other parameters without affecting the scope of the invention or any embodiment thereof. All patents and publications cited herein are incorporated by reference in their entirety.

We claim:

1. A non-transitory computer readable medium containing instructions to filter updates on social networking sites to provide information about one or more locations and spread of illnesses, the instructions causing a server to execute the following:
   apply a search engine onto aggregated, real-time, social media data to single out key words and/or phrases that indicate an illness, results of the applied search engine comprising a data subset;
   apply a search to the data subset to determine location information including one or more of city, state, province, country or zip code;
   for each of the results of the data subset, check for location information, wherein when location information is found, a latitude and longitude is determined from the location information, and when location information is not found, discarding results in the data subset that do not contain location information;
   filter the data subset by removing results from the data subset that include negative key words and phrases that indicate false reports of an illness;
   create a qualified aggregate data set based on the filtered data subset;
   plot remaining qualified aggregate data that contains latitude and longitude information, and that does not contain any of the negative key words or phrases, on a map;
   display the qualified aggregate data overlaid on a map; and
   provide tools for selecting and changing views and visualizations of the qualified aggregate data and sharing and commenting on the qualified aggregate data with social networking tools.

2. The non-transitory computer readable medium of claim 1, wherein the qualified aggregate data are displayed in a manner from a group selected from: on a website, or an application, or other media such as television, radio and print.

3. The non-transitory computer readable medium of claim 2, wherein the instructions cause the server to execute providing a service website, wherein at least some of the qualified aggregate data is provided only to paid members of the service website.

4. An online service system, comprising:
   a server, the server comprising:
      a data transmission unit;
      a verification unit, coupled to the data transmission unit, for sending a verification link corresponding to a user account that is not verified through the data transmission unit; and
      a service providing unit, coupled to the verification unit and the data transmission unit, for providing a service website, wherein said online service system filters updates on social networking sites to provide information about one or more locations and spread of illnesses, said server comprising non-transitory computer readable medium containing instructions executable on the server to:
         apply a search engine onto aggregated, real-time, social media data to single out key words and/or phrases that indicate an illness, results of the applied search engine comprising a data subset;
         apply a search to the data subset to determine location information for each of the results of the data subset including one or more of city, state, province, country or zip code, wherein for each of the results, when location information is found, a latitude and longitude is determined from the location information, and when location information is not found, discarding results in the data subset that do not contain location information;
         filter the data subset by removing results from the data subset that include negative key words and phrases that indicate false reports of illness;
         create a qualified aggregate data set based on the filtered data subset;
         plot remaining qualified aggregate data that contains latitude and longitude information, and that does not contain any of the negative key words or phrases, on a map;
         display the qualified aggregate data overlaid on a map; and
         provide tools for selecting and changing views and visualizations of the qualified aggregate data and sharing and commenting on the qualified aggregate data with social networking tools.

5. The online service system of claim 4, wherein the qualified aggregate data are displayed in a manner from a group selected from: on a website, or an application, or other media such as television, radio and print.

6. The online service system of claim 5, wherein the non-transitory computer readable medium contains instructions executable on the server to provide the service website, wherein at least some of the qualified aggregate data is provided only to paid members of the service.

7. A method for providing an online service, adapted to a server providing a service website, the method comprising:
   sending by the server a verification link from a verification unit, the verification link corresponding to a user account that is not verified through a data transmission unit; and
   a service providing unit, coupled to the verification unit and the data transmission unit, for providing a service web site, wherein said online service system filters updates on social networking sites to provide information about one or more locations and spread of illnesses, said server comprising non-transitory computer readable medium containing instructions executable on the server to:

apply a search engine onto aggregated, real-time, social media data to single out key words and/or phrases that indicate an illness, results of the applied search engine comprising a data subset;

apply a search to the data subset to determine location information including one or more of city, state, province, country or zip code;

for each of the results of the data subset, checking for location information, wherein when location information is found, a latitude and longitude is determined from the location information, and when location information is not found, discarding results in the data subset that do not contain location information;

filter the data subset by removing results from the data subset that include negative key words and phrases that indicate false reports of illness;

creating a qualified aggregate data set based on the filtered data subset;

plot, by the server, remaining qualified aggregate data that contains latitude and longitude information, and that does not contain any of the negative key words or phrases, on a map;

display, by the server, the qualified aggregate data overlaid on a map; and provide, by the server, tools for selecting and changing views and visualizations of the qualified aggregate data and sharing and commenting on the qualified aggregate data with social networking tools.

8. The method of claim 7, wherein the qualified aggregate data are displayed in a manner from a group selected from: on a website, or an application, or other media such as television, radio and print.

9. The method of claim 8, further comprising providing the website service, wherein at least some of the qualified aggregate data is provided only to paid members of the website service.

10. The non-transitory computer readable medium of claim 1, wherein the instructions causing the server to filter the data subset by removing results from the data subset that include negative key words and phrases further cause the server to apply natural language processing to the data subset.

11. The online service of claim 4, wherein the instructions causing the server to filter the data subset by removing results from the data subset that include negative key words and phrases further cause the server to apply natural language processing to the data subset.

12. The method of claim 7, wherein filtering the data subset by removing results from the data subset that include negative key words and phrases further includes applying natural language processing to the data subset.

* * * * *